(12) United States Patent  
Thornburgh et al.

(10) Patent No.: US 8,069,251 B2
(45) Date of Patent: Nov. 29, 2011

(54) SYSTEM AND/OR METHOD FOR CLIENT-DRIVEN SERVER LOAD DISTRIBUTION

(75) Inventors: Michael Thornburgh, Santa Cruz, CA (US); Matthew Kaufman, Bonny Doon, CA (US)

(73) Assignee: Adobe Systems Incorporated, San Jose, CA (US)

(*) Notice: Subject to any disclaimer, the term of this patent is extended or adjusted under 35 U.S.C. 154(b) by 517 days.

(21) Appl. No.: 11/757,126

(22) Filed: Jun. 1, 2007

(65) Prior Publication Data

US 2008/0301219 A1  Dec. 4, 2008

(51) Int. Cl.
  *G06F 15/16* (2006.01)
  *G06F 15/173* (2006.01)

(52) U.S. Cl. ........ 709/227; 709/228; 709/229; 709/201; 709/202; 709/240; 709/241

(58) Field of Classification Search ................. 709/227, 709/228, 229, 201, 202, 240, 241
See application file for complete search history.

(56) References Cited

U.S. PATENT DOCUMENTS

| | | | |
|---|---|---|---|
| 4,475,192 A | 10/1984 | Fernow et al. | |
| 5,506,968 A | 4/1996 | Dukes | |
| 5,774,660 A * | 6/1998 | Brendel et al. | 709/201 |
| 5,799,002 A | 8/1998 | Krishnan | |
| 5,857,072 A * | 1/1999 | Crowle | 709/203 |
| 5,938,732 A | 8/1999 | Lim et al. | |
| 5,960,404 A * | 9/1999 | Chaar et al. | 705/7.26 |
| 6,032,175 A | 2/2000 | Fletcher et al. | |
| 6,205,481 B1 | 3/2001 | Heddaya et al. | |
| 6,405,236 B1 * | 6/2002 | Nieratschker | 709/200 |
| 6,516,350 B1 | 2/2003 | Lumelsky et al. | |
| 6,563,793 B1 | 5/2003 | Golden et al. | |
| 6,578,077 B1 | 6/2003 | Rakoshitz et al. | |
| 6,631,118 B1 | 10/2003 | Jones | |
| 6,658,473 B1 | 12/2003 | Block et al. | |
| 6,725,272 B1 | 4/2004 | Susai et al. | |
| 6,766,348 B1 | 7/2004 | Combs et al. | |
| 6,798,786 B1 | 9/2004 | Lo et al. | |
| 6,925,482 B2 | 8/2005 | Gopal et al. | |
| 6,970,925 B1 | 11/2005 | Springmeyer et al. | |
| 7,039,916 B2 | 5/2006 | Jason, Jr. | |
| 7,246,356 B1 | 7/2007 | Lozben et al. | |
| 7,274,706 B1 * | 9/2007 | Nguyen et al. | 370/419 |
| 7,305,486 B2 | 12/2007 | Ghose et al. | |
| 7,403,945 B2 * | 7/2008 | Lin et al. | 707/8 |
| 2001/0032263 A1 | 10/2001 | Gopal et al. | |

(Continued)

FOREIGN PATENT DOCUMENTS

CA  2331046  7/2002

(Continued)

OTHER PUBLICATIONS

"Secure Hash Standard" Federal Information Processing Standards Publication 180-2, Aug. 1, 2002, pp. i-iii and 1-71.

(Continued)

*Primary Examiner* — Hieu Hoang
(74) *Attorney, Agent, or Firm* — Fish & Richardson P.C.

(57) ABSTRACT

The subject matter disclosed herein relates to communication between a client and a server in a communications network. In one particular example, a server is selected from a plurality of servers to provide a resource and/or a service to a client.

3 Claims, 3 Drawing Sheets

U.S. PATENT DOCUMENTS

| | | | |
|---|---|---|---|
| 2001/0042131 | A1 | 11/2001 | Mathon et al. |
| 2002/0042828 | A1 | 4/2002 | Peiffer |
| 2002/0049815 | A1 | 4/2002 | Dattatri |
| 2002/0062375 | A1 | 5/2002 | Teodosiu et al. |
| 2002/0062454 | A1 | 5/2002 | Fung |
| 2002/0065930 | A1 | 5/2002 | Rhodes |
| 2002/0107935 | A1 | 8/2002 | Lowery et al. |
| 2002/0112058 | A1 | 8/2002 | Weisman et al. |
| 2002/0120744 | A1 | 8/2002 | Chellis et al. |
| 2002/0129159 | A1* | 9/2002 | Luby et al. ............... 709/236 |
| 2002/0133593 | A1* | 9/2002 | Johnson et al. ............ 709/226 |
| 2002/0138618 | A1 | 9/2002 | Szabo |
| 2002/0150094 | A1* | 10/2002 | Cheng et al. ............... 370/389 |
| 2002/0174219 | A1 | 11/2002 | Mei et al. |
| 2002/0184310 | A1 | 12/2002 | Traversat et al. |
| 2003/0043846 | A1 | 3/2003 | Purpura et al. |
| 2003/0163702 | A1 | 8/2003 | Vigue et al. |
| 2003/0182425 | A1* | 9/2003 | Kurakake ............... 709/226 |
| 2003/0200252 | A1* | 10/2003 | Krum ................... 709/102 |
| 2003/0208599 | A1 | 11/2003 | Asano et al. |
| 2004/0015608 | A1 | 1/2004 | Ellis et al. |
| 2004/0028209 | A1 | 2/2004 | Fleming et al. |
| 2004/0078622 | A1 | 4/2004 | Manoskey |
| 2004/0151500 | A1* | 8/2004 | Misawa et al. ............... 398/58 |
| 2004/0193461 | A1* | 9/2004 | Keohane et al. ................ 705/7 |
| 2004/0215780 | A1* | 10/2004 | Kawato ................... 709/226 |
| 2005/0165921 | A1* | 7/2005 | Abadir et al. ............... 709/223 |
| 2005/0198634 | A1* | 9/2005 | Nielsen et al. ............ 718/100 |
| 2006/0041745 | A1 | 2/2006 | Parnes |
| 2006/0047831 | A1 | 3/2006 | Piper |
| 2006/0101081 | A1* | 5/2006 | Lin et al. .................. 707/200 |
| 2006/0215652 | A1* | 9/2006 | Strandridge et al. .......... 370/389 |
| 2007/0226743 | A1* | 9/2007 | Takahashi ............... 718/104 |
| 2007/0234428 | A1 | 10/2007 | Rash |
| 2007/0256078 | A1* | 11/2007 | Falk et al. ............... 718/104 |
| 2007/0260538 | A1* | 11/2007 | Deaton et al. ............... 705/39 |
| 2008/0075048 | A1* | 3/2008 | Suszko ................... 370/338 |
| 2008/0086453 | A1* | 4/2008 | Fabian ..................... 707/3 |
| 2008/0256180 | A1* | 10/2008 | Balazich et al. ............. 709/203 |
| 2008/0280623 | A1* | 11/2008 | Danne et al. .................. 455/453 |
| 2009/0024739 | A1 | 1/2009 | Thornburgh |
| 2009/0150534 | A1 | 6/2009 | Miller et al. |

FOREIGN PATENT DOCUMENTS

| | | |
|---|---|---|
| JP | 2000-151601 | 5/2000 |

OTHER PUBLICATIONS http://en.wikipedia.org/wiki/Gnutella, May 5, 2008, 8 pages.

http://en.wikipedia.org/wiki/BitTorrent_%28protocol%29, May 5, 2008, 13 pages.

http://en.wikipedia.org/wiki/Kazaa, May 5, 2008, 7 pages.

Co-pending Patent Application, filed Feb. 20, 2008, for related U.S. Appl. No. 12/034,649, 29 pages.

Co-pending Patent Application filed Jan. 3, 2008 for related U.S. Appl. No. 11/969,186, 22 pages.

International Search Report and Written Opinion mailed Jun. 27, 2008 in related matter PCT/US2008/053865, 14 pages.

International Search Report and Written Opinion mailed Oct. 28, 2008 in related matter PCT/US08/063739, 9 pages.

Menezes et al., Handbook of Applied Cryptography, CRC Press, 1996, pp. 321-383, 64 pages.

Kaufman & Thornburgh, *The Secure Media Flow Protocol*, Version 1.2, Dec. 14, 2005.

U.S. Appl. No. 11/779,165, filed Jul. 17, 2007, Thornburgh et al.

"Secure Hash Standard" Federal Information Processing Standards Publication 180-2, Aug. 1, 2002, pp. i-iii and 1-71.

http://en.wikipedia.org/wiki/BitTorrent_%28protocol%29, May 5, 2008, 13 pages.

Co-pending U.S. Appl. No. 11/779,165, filed Jul. 17, 2007.

Co-pending Patent Application, filed Feb. 20, 2008, for related U.S. Appl. No. 12/034,649.

Co-pending Patent Application filed Jan. 3, 2008 for related U.S. Appl. No. 11/969,186.

International Search Report and Written Opinion mailed Jun. 27, 2008 in related matter PCT/US2008/053865.

Office action mailed Sep. 3, 2009 in related matter U.S. Appl. No. 11/779,165, 21 pages.

Amendment filed Oct. 28, 2009 for U.S. Appl. No. 11/779,165, 30 pages.

Office action: Restriction Requirement mailed Nov. 3, 2009 for U.S. Appl. No. 11/969,186, 7 pages.

"Real-Time Media Flow Protocol Frequently Asked Questions-External", Jul. 2008. http://download.macromedia.com/pub/labs/flashplayer10/flashplayer10_rtmfp_faq_070208.pdf (accessed on May 8, 2009), 5 pages.

Allman, M. et al., "RFC 2581: TCP Congestion Control", Apr. 1999, to be published by the USPTO, 13 pages.

Andreasson, "Chapter 4.4. TCP Connections", 2001, Downloaded from the internet at http://www.faqs.org/docs/iptables/tcpconnections.html on May 9, 2008, 4 pages.

Aron, et al., "Cluster Reserves: A Mechanism for Resource Management in Cluster-based Network Servers", 2000, Department of Computer Science, Rice University, pp. 90-101, ACM, 13 pages.

Bernstein, "SYN Cookies", downloaded from the internet at http://cr.yp.to/syncookies.html, on May 9, 2008, 3 pages.

PAI et al, "Locality-Aware Request Distribution in Clusterbased Network Servers", 1998, Department of Electrical and Computer Engineering, Rice University, pp. 205-216, ACM, 13 pages.

Postel, J., "RFC 768: User Datagram Protocol", Aug. 1980, to be published by the USPTO, 3 pages.

U.S. Patent Office, U.S. Appl. No. 11/969,186, in Office Action mailed Dec. 16, 2009, 8 pages.

Stewart, "Stream Control Transmission Protocol", Sep. 2007, Network Working Group, Request for Comment 4960, downloaded from the internet at http://www.ietf.org/rfc/rfc4960.txt on May 9, 2008, 150 pages.

\* cited by examiner

SYSTEM AND/OR METHOD FOR CLIENT-DRIVEN SERVER LOAD DISTRIBUTION

TECHNICAL FIELD

The subject matter disclosed herein relates to server load distribution.

BACKGROUND

In a typical client-server network topology, a client may receive a requested service and/or resource from anyone of several servers capable of providing the requested service and/or resource. A server is typically resource constrained and may be slow to respond to requests from a client if the server is already heavily loaded with other tasks and/or requests. Accordingly, load balancing techniques are typically applied to multiple servers to, for example, direct new requests for server resources to servers that are the least busy or occupied.

To facilitate load balancing among a cluster of servers, for example, a load monitor is typically deployed for routing requests for server resources to servers in the cluster that are least loaded. Here, such a load monitor may track metrics associated with servers to determine the extent to which they are occupied or busy. New requests are then typically routed to the server or servers in the cluster that are the least occupied. Such a system for load balancing among a plurality of servers in a cluster is described in U.S. Pat. No. 7,039,916. Additionally, geographic load balancing systems are typically available to direct client requests to a geographically nearest server having sufficient resources available to provide a requested resource to a client. However, such geographic load balancing systems are typically costly and complex.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "obtaining," "hosting," "maintaining," "representing," "modifying," "receiving," "transmitting," "establishing," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, process described herein, with reference to flow diagrams or otherwise, may also be executed and/or controlled, in whole or in part, by such a computing platform.

A "computer program" as referred to herein relates to an organized list of instructions that, when executed, causes a computing platform and/or machine to behave in a predetermined manner. Here, for example, a computer program may comprise machine-readable instructions that are executable by a computing platform to perform one or more desired tasks. In one particular embodiment, although claimed subject matter is not limited in these respects, a computer program may define inputs and outputs such that execution of the program may provide outputs based, at least in part, on the inputs. However, these are merely examples of a computer program and claimed subject matter is not limited in these respects.

According to an embodiment, a computer program may comprise one or more "software components" comprising instructions that are executable as an integrated part of the computer program. Here, for example, a computer program may comprise multiple software components that are individually created to perform associated functions of the computer program. The different components may then be integrated together to provide a functioning computer program. However, these are merely examples of a computer program and claimed subject matter is not limited in these respects.

An "application" as referred to herein relates to a computer program or group of computer programs capable of providing a desired result and/or action. In a particular embodiment, for example, such an application may comprise one or more computer programs that perform tasks in connection with providing a service and/or resource to a user. For example, although claimed subject matter is not limited in these respects, an application may comprise one or more end-user computer programs such as database programs, spreadsheets, word processors, computer programs that are accessible through a network browser, electronic mail, interactive games, video and/or image processing programs, media presentation programs, calendars, financial application software, inventory control systems and/or the like. However, these are merely examples of an application and claimed subject matter is not limited in these respects.

In one embodiment, a computing platform may comprise one or more "communication adapters" to enable communication between processes executing on the computing platform and a network. Such a communication adapter may comprise a device capable of transmitting information to and/or receiving information from a communication channel and/or data link. In one particular embodiment, for example, a communication adapter may be capable of transmitting information to and/or receiving information from a data transmission medium according to a predefined communication protocol. However, this is merely an example of a communication adapter and claimed subject matter is not limited in this respect.

A "network" as referred to herein relates to a plurality of devices capable of communicating through transmission of information over data transmission media. In a particular example, a network may transmit data between devices over data links according to one or more communication protocols. However, this is merely an example of a network according to a particular embodiment and claimed subject matter is not limited in this respect.

A "client" as referred to herein relates to a process that is capable of communicating with other processes through a network to perform one or more functions or tasks. For example, a client may comprise one or more application programs hosted on a computing platform capable of transmitting information to and/or receiving information from a network through a communication adapter. However, this is merely one example of an implementation of a client according to a particular embodiment and claimed subject matter is not limited in this respect.

A "server" as referred to herein relates to a process that is capable of providing a service and/or resource to other processes, such as clients, in communication with the server over a network. In one particular example, a server may comprise one or more application programs hosted on a computing platform capable of transmitting information to and/or receiving information from a network through a communication adapter. However, this is merely one example of an implementation of a server according to a particular embodiment and claimed subject matter is not limited in this respect.

A "session" as referred to herein relates to period during which processes communicate over a network to perform one or more tasks, operations and/or functions. In one particular embodiment, a session may be established between a client and a server for the purpose of providing one or more resources and/or services to the client. For example, such a client and server may be adapted to communicate through the transmission of datagrams and/or packets according to a protocol. In a particular embodiment, such a session may be established according to a particular communication protocol enabled by a network employing network, data link and physical layer protocols for transmission of information between processes according to associated addresses.

The use of a load balancing monitor for load balancing among servers typically entails the use of a dedicated network appliance to monitor network traffic between a network and servers in a cluster of servers. This typically also requires server resources to be closely located within a geographical area and to be connected to the load balancing monitor. Accordingly, the use of such a load balancing monitor may be ineffective at efficiently allocating server resources that are geographically dispersed. As pointed out above, geographic load balancing solutions may enable allocation of server resources that are geographically dispersed. However, such systems are complex to set and administer, and often require reconfiguration if a network environment changes. According to a particular embodiment, a client to receive a service and/or resource may select from among a plurality of servers to provide that service and/or resource based, at least in part, on a measurement of "responsiveness" of such servers in a manner that obviates the need for a dedicated load balancing monitor and enables efficient allocation of server resources that are geographically dispersed. Here, responsiveness of a server may be caused by multiple factors such as, for example, availability of computing resources at the server to respond to client requests, and delays associated with transmitting information in a network between the server and a client. However, these are merely examples of factors that may determine a responsiveness of a server and claimed subject matter is not limited in this respect.

Responsiveness of a server may be measured based, at least in part, on a round-trip delay between transmission of a message from a client to the server and receipt of a response message at the client. A first portion of the round-trip delay may comprise a delay associated with processing a message received at the server and transmitting a response message from the server. Here, a server that is heavily loaded with other tasks may incur a longer delay in processing such a message than a server that is not as heavily loaded. A second portion of the round-trip delay may comprise a delay associated with transmitting messages between a client and a server over network infrastructure. For example, transmitting messages between a client and a first server may incur a shorter delay than a delay associated with transmitting message between a client and a second server which are geographically further apart from one another than the client and the first server.

Figure 1:
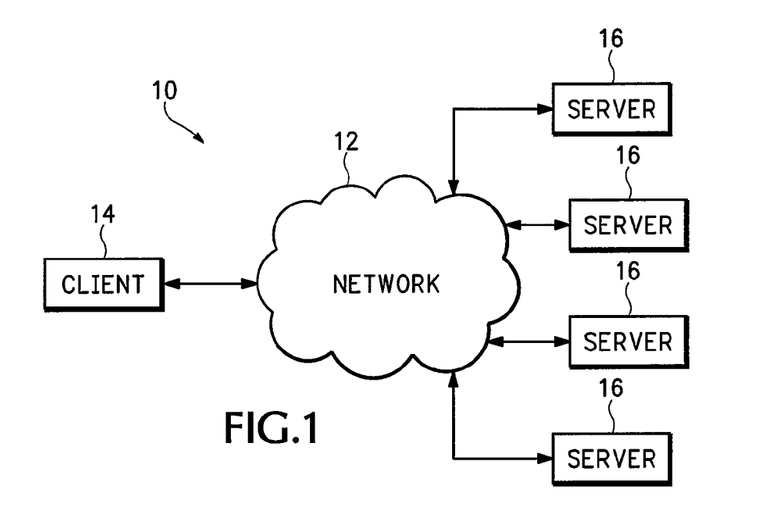
FIG. 1 is a schematic diagram of a network topology for transmitting information between clients and servers according to an embodiment.

FIG. 1 is a schematic diagram of a system 10 that is capable of establishing a session between a client 14 and one or more servers 16 over a network 12. Network 12 may employ data links (not shown) comprising one or more data transmission mediums such as, for example, cabling (e.g., fiber optic, twisted wire pair, coaxial), satellite transmission links or terrestrial wireless transmission links. However, these are merely examples of data transmission media that may be used for transmitting information in a network and claimed subject matter is not limited in this respect. Additionally, network 12 may employ one or more communication protocols for transmitting information between a source and a destination such as, for example, an Internet Protocol (IP), asynchronous transfer mode (ATM) and/or communication protocols adapted for use on wireless transmission links. However, these are merely examples of communication protocols that may be used for transmitting information between a source and a destination in a network and claimed subject matter is not limited in these respects. In particular embodiments, network 12 may comprise one or more network topologies and/ or configurations such as, for example, one or more local area networks, one or more Intranets, the Internet, wireless carrier infrastructure Internet versus Intranet, and/or wireless carrier infrastructure, just to name a few examples.

According to an embodiment, client 14 may comprise one or more processes hosted on a computing platform that is communicatively coupled to network 12 by a communication adapter (not shown). Similarly, servers 16 may comprise processes hosted on one or more computing platforms connected to network 12 by an associated communication adapter. In particular embodiments, each server 16 may be hosted on its own associated computing platform which is distinct from computing platforms hosting other servers 16. Alternatively, two or more servers may be hosted on a single computing platform.

According to an embodiment, client 14 may select a server from among servers 16 to provide a service by, for example, establishing a session through which client 14 and server 16 may communicate over network 12. In particular embodiments, although claimed subject matter is not limited in this respect, a server may comprise a print server adapted to process print jobs, web server, email server, content server adapted to distribute audio or video content (e.g., through streaming) such as, for example, the Adobe® Flash Media Server sold by Adobe Systems Inc. and/or other servers capable of streaming audio and/or video content. Client 14 may comprise any one of several application programs hosted on a computing platform such as, for example, email applications, web browsers, document processing programs, media players such as the Adobe® Flash Player sold by Adobe Systems Inc., and/or the like. Here, it should be understood that client 14 may be hosted and/or executed on any one of several devices capable of communicating with a network such as, for example, personal computers, mobile telephones, set-top boxes, Internet-connected televisions, home audio/video entertainment systems, personal digital assistants, just to name a few examples.

According to an embodiment, client 14 may select a server 16 to provide a resource and/or service based, at least in part, on a responsiveness of the selected server which is measured by client 14. For example, client 14 may select a server 16 that is the most responsive from among servers 16 measured based, at least in part, on one or more responses to messages transmitted substantially simultaneously to servers 16 from client 14. As pointed out above, responsiveness of a server 16 may result from, at least in part, an availability of computing resources at server to respond to a request from client 14. For example, if a server 16 is currently committed to providing resources to satisfy other requests (e.g., from other clients), such a server 16 may have limited remaining resources to respond to the request from client 14.

Also as pointed out above, responsiveness of a server 16 may result from, at least in part, delays and/or throughput associated with network 12 in transmitting information between client 14 and such a server 16. Here, for example, portions of network 12 may be more robustly configured to handle network traffic than other portions. Also, certain events may affect delays and/or throughput associated with transmitting information between client 14 and such a server 16 such as, for example, other demands of network resources and equipment outages, just to name a few examples.

According to an embodiment, although claimed subject matter is not limited in this respect, client 14 is adapted to transmit a plurality of initiation messages over network 12 to servers 16 substantially simultaneously. Client 14 may determine a responsiveness of servers 16 based, at least in part, on any responses received from servers 16 to the substantially simultaneously transmitted initiation messages. Client 14 may determine a responsiveness of a server based, at least in part, on a delay between transmitting initiation messages and receipt of a response to an initiation message from the server. Here, for example, client 14 may select a most responsive server 16 to establish a session if a response from the selected server 16 to the substantially simultaneously transmitted initiation messages is the earliest received response.

Figure 2:
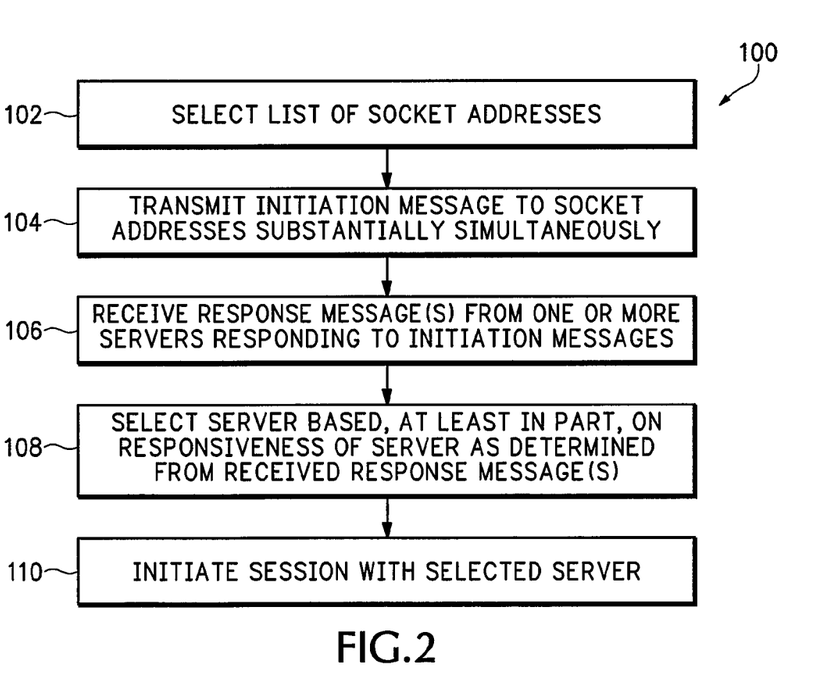
FIG. 2 is a flow diagram of a process associated with actions of a client for initiating a session with a server according to an embodiment.
Figure 3:
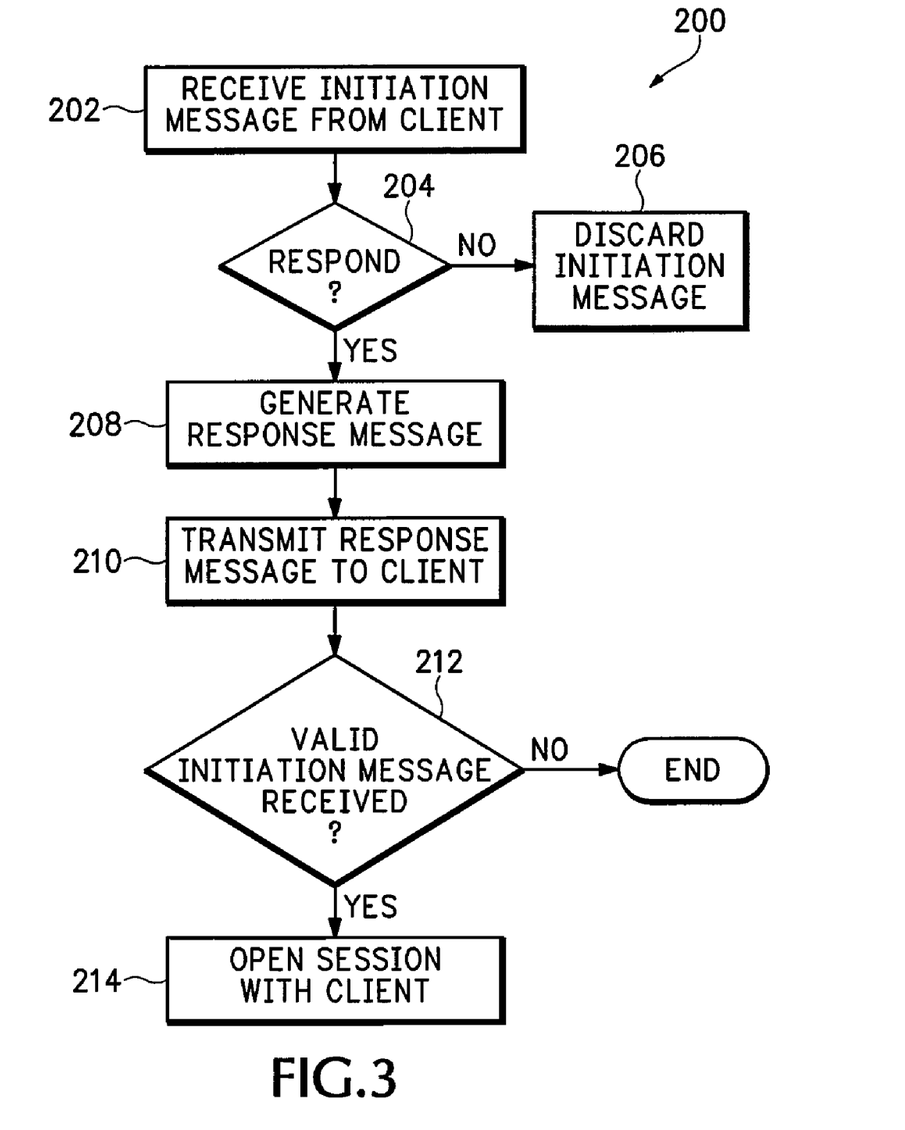
FIG. 3 is a flow diagram of a process associated with actions of a server which is responsive to a request for a service from a client device according to an embodiment.

FIG. 2 is a flow diagram of a process 100 associated with actions of a client for initiating a session with a server according to an embodiment. FIG. 3 is a flow diagram of a process 200 associated with actions of a server device for responding to messages from a client attempting to initiate a session. In one particular embodiment, although claimed subject matter is not limited in this respect, a client and servers may employ messages defined in the Secure Media Flow Protocol, Version 1.2, Dec. 14, 2005 (hereinafter "Media Flow Protocol" or "MFP"). As illustrated below, a client may employ MFP to establish a session with a server selected from two or more servers through an exchange of messages in datagrams transmitted through a network according to a User Datagram Protocol (UDP) (e.g., over Internet Protocol (IP) packets). While particular examples provided herein establish a session between a client and a server using the MFP, it should be understood that such implementations are merely examples of establishing a session between a client and a server provided for the purpose of illustration, and that claimed subject matter is not limited to such implementations. Features described herein may be implemented using different communication protocols without deviating from claimed subject matter.

According to an embodiment, a client may maintain a data structure identifying servers that are capable of providing resources and/or services. In a particular example, such a data structure may associate socket addresses with servers where a socket address may comprise, for example, information combining an IP address and a UDP port number. At block 102, a client may identify servers (e.g., servers 16) capable of providing a particular desired resource and/or service through a session with such a client. Such a particular desired resource and/or service may comprise, for example, any of the above identified resources and/or services, for example. The identified servers may then be associated with a list of selected socket addresses from the data structure. For a particular resource and/or service, such as those provided by a print server or a media content server, for example, such a data structure may associate such a resource and/or service with socket address of servers that are capable of providing that particular resource and/or service.

At block 104, a client 14 may transmit initiation messages to servers selected at block 102 substantially simultaneously. According to an embodiment, such initiation messages may be addressed according to socket addresses associated with servers identified at block 102 and comprise, for example, a unique tag identifying the particular request from such a client. Such a unique tag may comprise, for example, a pseudo random number and/or sequence of bytes generated by a client using any one of several techniques. In one particular example, an initiation message transmitted at block 104 may comprise an "Initiator Hello" or "IHello" message defined according to the aforementioned MFP, for example. Again, it should be understood that this is merely one example of how an initiation message may be transmitted to a server according to a protocol in a particular example and claimed subject matter is not limited in this respect.

FIG. 3 is a flow diagram of a process 200 hosted on a server which is responsive to an initiating message transmitted from a client (e.g., at block 104 in FIG. 2). For example, at block 202, a server may receive an initiation message from a client addressed according to a socket address associated with the server and comprising a unique tag generated by the client generating the initiation message. At diamond 204, a server may determine whether to respond to the received initiation message. Rather than respond to the received initiation message, a server may discard the received initiation message if, for example, the initiation message is from an unauthorized client or the server is otherwise unavailable to engage in a session with the client. Alternatively, a server may discard the received message as an implementation of a statistical approach to discard the received message with increasing likelihood as the server becomes increasingly loaded. Here, under certain conditions, a server may more likely discard a request rather than provide a delayed response.

At block 208, a server may generate a response message responsive to an initiation message received from a client at block 202 comprising information identifying the received initiation message and additional information associated with the server. For example, such a response message may comprise a tag extracted from the received initiation message and a cookie generated by the server based, at least in part, on an address of the client (e.g., from a source address in a received datagram encapsulating the received initiation message), current time and/or secret information known to the server. Here, such a cookie may be generated from a hash combining the aforementioned address of the client, current time and/or secret information, for example. A responsive message generated at block 208 may also include a cryptographic certificate associated with the server, for example.

At block 210, a server may transmit a response generated at block 208 to a client according to the client's address. In a particular embodiment, the server may format the response message as a "Responder Hello" or "RHello" message defined according to the aforementioned MFP, for example. Again, it should be understood that this is merely one example of how a response message may be formatted for transmission to a client in response to receipt of an initiation message according to a protocol in a particular example, and claimed subject matter is not limited in this respect.

Returning to FIG. 2, at block 106, a client may receive one or more response messages from one or more servers responsive to initiation messages transmitted at block 104. In a particular example, such message received at block 106 may comprise response messages transmitted by a server at block 210 as illustrated above according to a particular example. Here, by including the tag of a received initiation message "echoed" back from a client, a received response message may be readily associated with initiation messages transmitted at block 104. Accordingly, at block 106, a client may associate received response messages with initiation messages transmitted substantially simultaneously at block 104.

According to an embodiment, at block 108 a client may select a server (for initiating a session) based, at least in part, on response messages received at block 106. Here, block 108 may select a server based, at least in part, on its responsiveness to messages transmitted at block 104. For example, block 108 may select a most responsive server as being the server transmitting the earliest response message received at block 106 associated with particular initiation messages. In a particular embodiment where a response message includes a tag echoed back from a particular set of initiation messages transmitted substantially simultaneously at block 104, for example, block 108 may associate such an echoed tag with the particular set of initiation messages. Here, a client may select the most responsive server as, for example, the server transmitting the earliest received response message having an echoed tag associated with such a particular set of initiation messages. In a particular implementation, a client may discard any reference to an original tag upon receipt of such an earliest response message so that such subsequent response messages are not recognized. It should be understood, however, that this is merely one example of how the responsiveness of one or more servers may be evaluated according to a particular embodiment and claimed subject matter is not limited in this respect.

Upon selecting a server at block 108 from among a plurality of servers, a client may initiate a session with the selected server at block 110. For example, such a client may transmit a session initiation message to the socket address of the selected server containing, for example, a cookie from a response message received from the selected server and session negotiation information. Such session negotiation information may include, for example, a session identifier to be used by the selected server in labeling packets transmitted to the client during the session. Such session negotiation information may also include keying information to be used in negotiating a secure communications channel during the session. Such keying information may comprise, for example, an initiator certificate associated with the client, initiator session key component and/or a digital signature. In a particular implementation, a client may format such a session initiation message as an "Initiating Initial Keying" or "IIKeying" message defined according to the aforementioned MFP, for example.

By receiving a cookie echoed back in a session initiation message transmitted at block 110, a server may determine whether the received session initiation message is valid at diamond 212 by comparing the echoed cookie with the cookie formed at block 208 and transmitted in a response message at block 210. Upon receipt of such a valid session initiation message, a server at block 214 may open a session by, for example, responding to a valid session initiation message with transmission of a session initiation response message to the requesting client. Such a session initiation response message may comprise, for example, a session identifier to be used by the client in labeling packets transmitted to the server during the session and keying information. Such keying information may include, for example, a responder session key component. In a particular implementation, a server may format such a session initiation response message as a "Responder Initial Keying" or "RIKeying" message defined according to the aforementioned MFP, for example.

In a particular embodiment, a server at block 210 may deliberately delay transmitting a response message to a requesting client based upon certain conditions such as, for example, a condition where the server is heavily loaded with requests from other clients. With such a delayed response, the server may less likely appear to be the most responsive server, for example.

In a particular embodiment where a session initiation message from a client to a selected server comprises a initiator session key component and a session initiation response message from a selected server to the client, such session key components may collectively contribute to an encryption key to be used in maintaining security of information in packets transmitted during a session. For example, such an encryption key may be determined from a concatenation of the session key components or a hash function based on the session key components.

In embodiments illustrated above, unless a server is selected by a client (e.g., upon receipt of a session initiation message) a server may employ few computational resources to establishing a connection with the client. By merely preparing and transmitting a response message to a requesting client at block 208, a server need only maintain a copy of an associated cookie that is included in the response message and/or information for computing the cookie for a limited time period (e.g., long enough to validate an initiation message at diamond 212).

In one embodiment, a server may discard the cookie included in a response message transmitted at block 210 and then recreate the cookie in response to a session initiation message from a client. For example, upon receipt of a session initiation message from a client at a server, diamond 212 may compute a cookie based upon secret information used by the server to create a cookie included in a response message at block 208, source address of the received session initiation message and current time. Here, the server may maintain a current time in discrete increments (e.g., 30 seconds). If diamond 212 can match the computed cookie with information in the received session initiation message, diamond 212 may determine that the received session initiation message is valid. If no match is found, diamond may compute a second cookie based upon the secret information, source address of the received session initiation message and a previous current time. If diamond 212 can not match the second cookie with information in the received session initiation message, the session initiation message may be determined to be invalid.

By discarding a cookie included in a response message, a server remains stateless until determination of receipt of a valid session initiation message at diamond 212. Accordingly, a client need only establish a single session and/or logical connection with a selected server in the process of selecting the server from among a plurality of servers.

In particular embodiments, it should be understood that a client may initiate transmission of initiation messages at block 102 in a network through one or more communication adapters of a computing platform hosting the client. As such, multiple messages to be transmitted substantially simultaneously may be queued in a buffer for transmission in a data transmission medium. Here, while some initiation messages may actually commence transmission prior to other messages, delays in the transmission of one initiation message relative to another initiation message may be insignificant with respect to measuring responsiveness of a server to such an initiation message at blocks 106 and 108, for example.

According to an embodiment, a single computing platform may host multiple servers capable of providing a resource and/or service to a client. Here, it should be understood that such multiple servers may have distinct socket addresses, permitting a client to separately transmit multiple initiation messages to different servers hosted on a single computing platform, and individually select such a server based, at least in part, on receipt of associated response messages without deviating from claimed subject matter.

Figure 4:
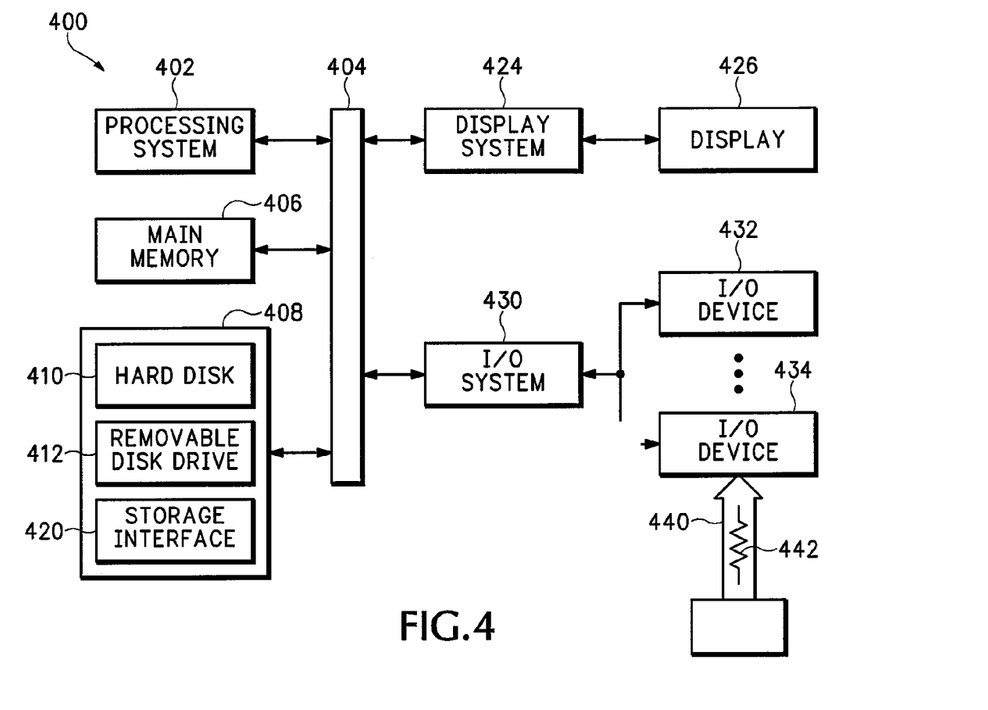
FIG. 4 is a schematic diagram of a computing platform according to an embodiment.

FIG. 4 is a schematic diagram of a computing platform 400 that may host a server or client as illustrated above according to a particular embodiment. Computing platform 400 includes a processing system 402, which may include a central processing unit such as a microprocessor or microcontroller for executing programs to control tasks in the machine 400, thereby enabling features and function described above. Moreover, the processing system 402 may include one or more additional processors, which may be discrete processors or may be built in to the central processing unit.

Processing system 402 is coupled with a bus 404, which is adapted to transmit signals between processing system 402 and other devices. Computing platform 400 may include embedded controllers, such as, for example, Generic or Programmable Logic Devices or Arrays (PLD, PLA, GAL, PAL), Field Programmable Gate Arrays (FPGA), Application Specific Integrated Circuits (ASIC), single-chip computers, smart cards, or the like.

Computing platform 400 may include a main memory 406 and one or more cache memories, and may also include a secondary memory 408. These memories provide storage of machine-readable instructions and data for computer programs to be executed by processing system 402. Here main memory 406 and secondary memory 408 may comprise one or more of the above identified storage media. In the particular illustrated implementation, secondary memory 408 may include, for example, a hard disk drive 410, a removable storage drive 412 and/or a storage interface 420.

Computing platform 400 may also include a display system 424 for connecting to a display device 426 and an input/output (I/O) system 430 (e.g., one or more controllers or adapters for providing interface functions) for connecting to one or more I/O devices 432 through 434. I/O system 430 may provide a communications interface, which allows information to be transmitted, in the form of signals 442, between computing platform 400 and external devices, networks or information sources. Signals 442 may be transmitted in any type of transmission media (e.g., as electronic, electromagnetic or optical transmission media) to be received via a channel 440 (e.g., wire, cable, optical fiber, phone line, infrared (IR) channel, radio frequency (RF) channel, etc.). A communications interface used to receive these signals 442 may comprise a network interface controller designed for a particular type of network, protocol and/or transmission medium, and/or may be designed to serve multiple networks, protocols and/or channel media.

Machine-readable instructions may be stored in computing platform 400 and/or delivered to computing platform 400 over a communications interface. It should be understood that computing platform 400 is merely an example of a computing platform capable of hosting a client or a server and that other systems, architectures, and modifications and/or reconfigurations may also be used without deviating from claimed subject matter.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
    transmitting an initiation message from a client to a plurality of servers over a network concurrently to request for a resource or a service, wherein said initiation message includes a tag identifying said initiation message;
    identifying at least one response message received from at least one server of said plurality of servers based at least in part on said tag identifying said initiation message in response to said initiation message transmitted to said plurality of servers, said at least one response message including said tag and a cookie generated by said at least one server, said cookie containing session negotiation information for establishing a session with said at least one server;

determining a responsiveness of each of said at least one server;
selecting at least one server of said at least one server to provide said resource or said service based, at least in part, on said responsiveness of each of said at least one server;
establishing said session with said selected at least one server to provide said resource or said service to said client, by transmitting a session initiation message to said selected at least one server, said session initiation message comprising said cookie;
wherein said selecting comprises selecting a server that sends an earliest response message to said initiation message and discarding reference to said tag upon receiving of said earliest response message at said client, wherein a subsequent response message including said tag received in response to said initiation message is not identified as a valid response message to said initiation message; and
wherein said transmitting said initiation message comprises concurrently transmitting a plurality of User Datagram Protocol (UDP) datagrams addressed to socket addresses of said plurality of servers, said UDP datagrams comprising said initiation message.

2. An article comprising:
a non-transitory storage medium comprising machine-readable instructions stored thereon which, in response to being executed by a computing platform, direct said computing platform to:
initiate transmission of an initiation message from a client to a plurality of servers over a network concurrently to request for a resource or a service, wherein said initiation message includes a tag identifying said initiation message;
identify at least one response message received from at least one server of said plurality of servers based at least in part on said tag identifying said initiation message in response to said initiation message transmitted to said plurality of servers, said at least one response message including said tag and a cookie generated by said at least one server, said cookie containing session negotiation information for establishing a session with said at least one server;
determine a responsiveness of each of said at least one server;
select at least one server of said at least one server to provide said resource or said service based, at least in part, on said responsiveness of each of said at least one server;
establish said session with said selected at least one server to provide said resource or said service to said client, by transmitting a session initiation message to said selected at least one server, said session initiation message comprising said cookie;
wherein said instructions to select said at least one server direct said computing platform to select a server that sends an earliest response message to said initiation message and discard reference to said tag upon receiving of said earliest response message at said client, wherein, such that a subsequent response message including said tag received in response to said initiation message is not identified as a valid response message to said initiation message; and
wherein said instructions to initiate said transmission of said initiation message direct said computing platform to initiate concurrent transmission of a plurality of User Datagram Protocol (UDP) datagrams addressed to socket addresses of said plurality of servers, said UDP datagrams comprising said initiation message.

3. A computing platform, said computing platform comprising:
a communication adapter to transmit and receive information from a network; and
a processing system coupled to said communication adapter, said processing system including a central processing unit being programmed with instructions to:
transmit an initiation message from a client through said communication adapter to a plurality of servers over said network concurrently to request for a resource or a service, wherein said initiation message includes a tag identifying said initiation message;
identify at least one response message received from said at least one server of said plurality of servers based at least in part on said tag identifying said initiation message in response to said initiation message transmitted to said plurality of servers, said at least one response message including said tag and a cookie generated by said at least one server, said cookie containing session negotiation information for establishing a session with said at least one server;
determine a responsiveness of each of said at least one server;
select at least one server of said at least one server to provide said resource or said service based, at least in part, on said responsiveness of each of said at least one server;
establish said session with said selected at least one server to provide said resource or said service to said client by transmitting a session initiation message through said communication adapter to said selected at least one server, said session initiation message comprising said cookie;
wherein said instructions to select said at least one server comprises selecting a server that sends an earliest response message to said initiation message and discarding reference to said tag upon receiving of said earliest response message at said client, wherein a subsequent response message including said tag received in response to said initiation message is not identified as a valid response message to said initiation message; and
wherein said instructions to transmit said initiation message comprises initiating concurrent transmission of a plurality of User Datagram Protocol (UDP) datagrams through said communication adapter and addressed to socket addresses of said plurality of servers, said UDP datagrams comprising said initiation message.

* * * * *

UNITED STATES PATENT AND TRADEMARK OFFICE
CERTIFICATE OF CORRECTION

PATENT NO. : 8,069,251 B2
APPLICATION NO. : 11/757126
DATED : November 29, 2011
INVENTOR(S) : Michael Thornburgh and Matthew Kaufman It is certified that error appears in the above-identified patent and that said Letters Patent is hereby corrected as shown below:

Claim 2, Column 11, Line 59, and Column 12, Line 1, delete "wherein, such that" and insert -- wherein -- a subsequent.

Claim 3, Column 12, Line 23, after "from" delete "said".

Signed and Sealed this
Twenty-first Day of February, 2012

David J. Kappos
*Director of the United States Patent and Trademark Office*